United States Patent [19]
Birkedahl et al.

[11] Patent Number: 6,133,846
[45] Date of Patent: Oct. 17, 2000

[54] LOW COST REDUNDANT COMMUNICATIONS SYSTEM

[75] Inventors: Byron F. Birkedahl, Glendale; Brett A. Eddy, Phoenix, both of Ariz.

[73] Assignee: Honeywell Inc., Minneapolis, Minn.

[21] Appl. No.: 08/723,066

[22] Filed: Oct. 1, 1996

[51] Int. Cl.[7] .............................. H04L 12/00; G06F 15/00
[52] U.S. Cl. ................... 340/825.16; 340/825.05; 340/825.02; 395/200.01; 370/431; 370/451; 370/458; 370/254
[58] Field of Search ........................ 340/825.16, 825.5, 340/825.05, 825.02; 395/200.01, 200.02, 200.03; 370/431, 451, 458, 254

[56] References Cited

U.S. PATENT DOCUMENTS

| | | | |
|---|---|---|---|
| 4,063,220 | 12/1977 | Metcalfe et al. | 340/147 |
| 5,377,109 | 12/1994 | Baker et al. | 364/424.06 |
| 5,379,289 | 1/1995 | DeSouza et al. | 370/85.13 |
| 5,386,503 | 1/1995 | Staggs et al. | 395/157 |

*Primary Examiner*—Michael Horabik
*Assistant Examiner*—Yonel Beaulieu
*Attorney, Agent, or Firm*—Snell & Wilmer

[57] ABSTRACT

A communications system capable of providing enhanced data integrity and reliability through redundant buses, and a network interface controller for use therewith. Redundant conductors conforming to well-known ethernet standards interconnect electronics components. Each component communicates with the conductors through a single network interface card (NIC). Each NIC comprises an ethernet compliant transceiver for each ethernet conductor in communication with the component. Microcontrollers embedded in each NIC synchronously and deterministically place data on the ethernet conductors according to a timing scheme stored in a non-volatile memory means. A heartbeat/power monitor is also provided to ensure that data cannot be transmitted in the event of a microcontroller failure. The communications system provides a high degree of redundancy and fault-tolerance and is therefore well-suited to critical applications in avionics communication.

18 Claims, 6 Drawing Sheets

LOW COST REDUNDANT COMMUNICATIONS SYSTEM

BACKGROUND OF THE INVENTION

1. Field of the Invention

The present invention relates to data bus networks. More particularly, this invention is a method and apparatus for implementing a redundant data bus network utilizing standard components. The present invention is particularly well-suited for use in a data network interconnecting avionics components onboard an aircraft.

2. Description of the Prior Art

Networking architectures connecting computers are well known in the prior art. Microprocessor based systems are widely interconnected by data networks, allowing for high speed data sharing, parallel processing and communication.

A number of methods and devices that allow computers to communicate exist. Ethernet, for example, is described in IEEE standard 802.3 and in U.S. Pat. No. 4,063,220 issued to Metcalfe et al. on Dec. 13, 1977, which is hereby incorporated by reference. Because ethernet is the world's most popular local area networking scheme, a number of low-cost components for implementing ethernets are widely available throughout the world.

The ethernet standard encompasses several varieties of cabling. 10base2 ethernet, for example, uses a coaxial cable of not more than 185 meters in length that is capable of transmitting ten megabits of information per second. 10baseT ethernet is also capable of transmitting ten megabits of information per second, but utilizes shielded twisted pair cables. All forms of ethernet utilize passive cables; devices communicating via the ethernet must contain active components. Typically, computing systems communicate over the ethernet through a standard network interface controller (NIC) that is well-known in the art. NICs are active devices that normally receive power from their associated computing hosts.

FIG. 1 describes a prior art NIC 106 containing transceiver 101 and a backplane interface 104. The transceiver 101 is capable of transmitting and receiving analog signals via an ethernet 107 and of converting these analog signals to digital equivalents. Backplane interface 104 is capable of transferring data between the NIC and the backplane bus 105, which is a component of a processing device such as a personal computer. Transceiver 101 and backplane interface 104 are coupled by a pair of conductors 119L and 119R, one for data to be transmitted on the ethernet and one for data received from the ethernet. Typically, communications between the backplane and the ethernet are controlled by a well-known system network interface controller (SNIC) 103 that transfers data between interface 104 and transceiver 101. An isolation circuit 102 is typically provided between transceiver 101 and SNIC 103 to insure signal quality by eliminating ground loops and faults. The isolation means 102 also serves to disable communications by the NIC 106 when a malfunction is detected.

Ethernet is an asynchronous protocol using a Carrier Sense Multiple Access with Collision Detect (CSMA/CD) access scheme. No central host controls access to the network, and no clocking scheme is utilized to control access to the conductor. Rather, NICs with data to transmit first check the ethernet to determine if it is busy transferring data from another host. If the ethernet is free, the NIC will transmit the data immediately. If the ethernet is busy, however, the NIC will wait a random period of time before re-checking for ethernet traffic. The ethernet standard limits the duration and frequency of data transmissions. If two NICs on the same ethernet begin transmitting simultaneously, each will sense that data has "collided" and will re-transmit after a random period of time.

When the ethernet remains very busy for a prolonged period of time, collisions and re-transmissions become more frequent. Each re-transmission creates additional traffic on the ethernet, and collision frequency can increase exponentially. As collision frequency increases, the time necessary to transmit data across the bus also increases. Because the CSMA/CD access scheme is asynchronous and non-deterministic, prior art ethernets are unsuitable for use in critical applications where immediate data transmissions are essential. In avionics applications, for example, a windshear detector or collision avoidance system may need to transmit an immediate warning to an autopilot system or to an output device. Because such signals may affect the safety of the aircraft, it is essential that they be transmitted without delay. Even a potential risk of transmission delay is unacceptable in such applications. Moreover, avionics components require certain information to be provided synchronously. Attitude and altitude readings, for example, must be provided to avionics components at regular intervals without fail. Inexpensive ethernet networks provide high bandwidth and proven physical layer characteristics; however, ethernet's asynchronous nature is too unstable for environments where data integrity and reliability are critical.

Modern aircraft include a number of digital avionics components such as traffic alert and collision avoidance systems (TCAS), autopilots, flight management systems (FMS) and integrated radio systems communicating over a system bus. Because the avionics system bus is essential to the intercommunication of avionics components and therefore the safety of the aircraft, the system bus must be highly reliable and fault tolerant.

Prior art avionics buses have utilized redundant conductors to improve reliability. Network standards such as the Avionics System Communications Bus (ASCB) allow avionics components within an aircraft to work together safely and efficiently. ASCB is a synchronous networking protocol, meaning that each component has an allotted share of guaranteed bandwidth. Referring to FIG. 2, ASCB includes four conductors 107 connecting two sets of avionics components 110 corresponding to a pilot's side and a copilot's side. Each avionics component 110 transmits data on an onside data bus and receives data via both the onside and cross-side data buses. In FIG. 2, conductor 107L is the onside bus and conductor 107R is the cross-side bus for components 110A, 110B, 110C and 110D. For components 110E, 110F, 110G and 110H, conductor 107R is the onside bus and conductor 107L is the cross-side bus. Thus the onside bus for components on one side of the aircraft is the cross-side bus for components on the other side of the aircraft.

Two backup buses 107LB and 107LR provide added redundancy by connecting those components on the same side of the aircraft. Each avionics component 110 is therefore in communication with at least three conductors: components send and receive data via the on-side and backup buses, and receive data from components on the opposite side of the aircraft via the cross-side bus.

While ASCB and other avionics buses such as MIL-STD-1553B provide the reliability necessary for avionics applications, these bus architectures have a number of marked disadvantages. Most notably, prior art avionics buses provide significantly lower bandwidth than comparable non-avionics bus technologies. Moreover, prior art buses are relatively expensive to implement because they have not been readily adopted for non-avionics applications. The specialized nature of prior art avionics buses has resulted in high costs of design, manufacturing and support. Moreover, the specialized nature of prior art avionics buses makes re-configuration difficult. System changes, expansion, and upgrades are complicated, expensive and time-consuming.

SUMMARY OF THE INVENTION

It is an object of the present invention to provide an avionics bus architecture that provides reliable and redundant data communications with a high bandwidth.

It is a further object of this invention to provide an avionics bus based upon low-cost physical layer components readily available from multiple suppliers.

It is a still further object of this invention to provide synchronous and deterministic access to an ethernet network.

It is a still further object of this invention to provide a network interface controller for a redundant avionics bus network that is capable of providing a power monitor and "heartbeat" signal.

It is a still further object of this invention to provide an avionics communications system that is easily expandable and re-configurable.

According to this invention, there is provided a redundant bus network including at least four coaxial cables serving as data conductors. Each avionics component utilizing the bus network communicates through a NIC that is comprised of at least three transceivers, at least two SNICs and a microcontroller means capable of directing data between the avionics component backplane bus and the coaxial cables. The microcontroller means transmits and receives data based upon a lookup table stored in a non-volatile memory means.

The above and other objects, features, and advantages of the present invention will become apparent from the following detailed description of illustrative embodiments thereof to be read in conjunction with the accompanying drawings, in which like reference numerals are used to identify the same or similar parts in the similar views.

DETAILED DESCRIPTION OF THE PREFERRED EMBODIMENT

For purposes of illustration, the communications architecture of the present invention is specifically described herein as being used to implement a network of avionics components. However, the bus architecture can also be used to implement a variety of other systems that require a high level of redundancy and reliability. For example, the bus architecture could be used in a network of health monitoring apparati, or in a climate or environmental control system.

Figure 1:
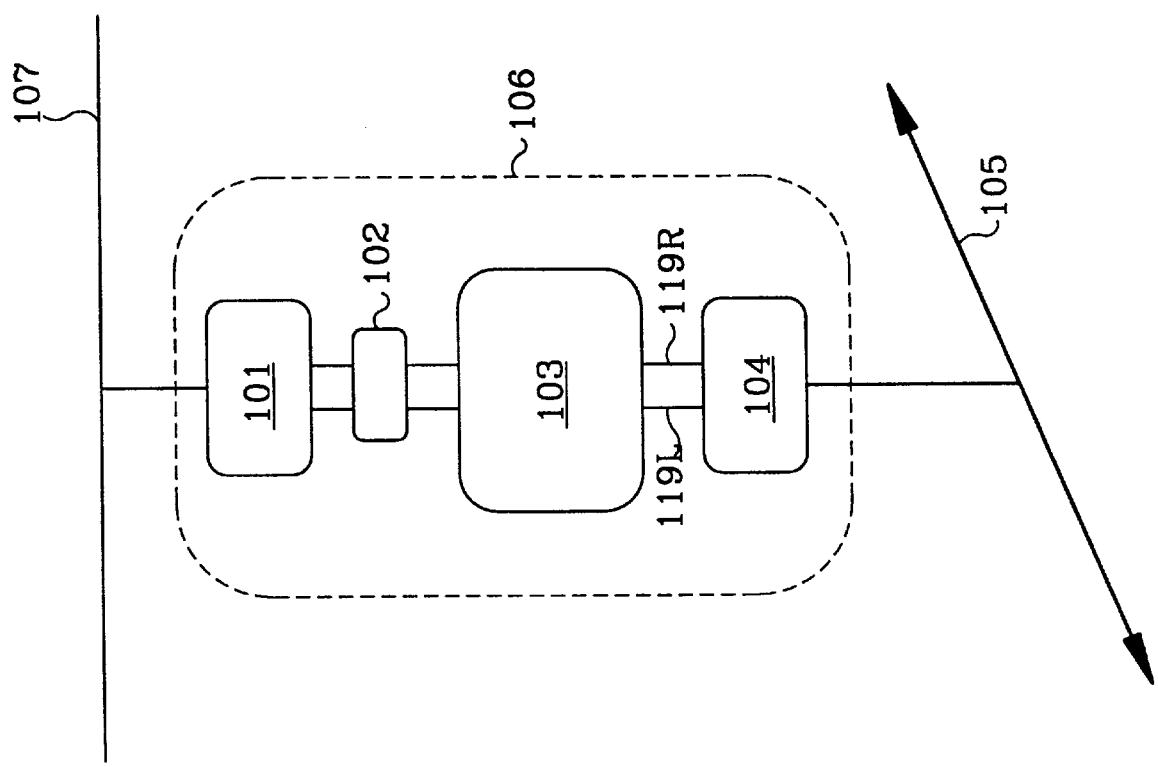
FIG. 1 is a block diagram of a prior art ethernet network interface controller.
Figure 2:
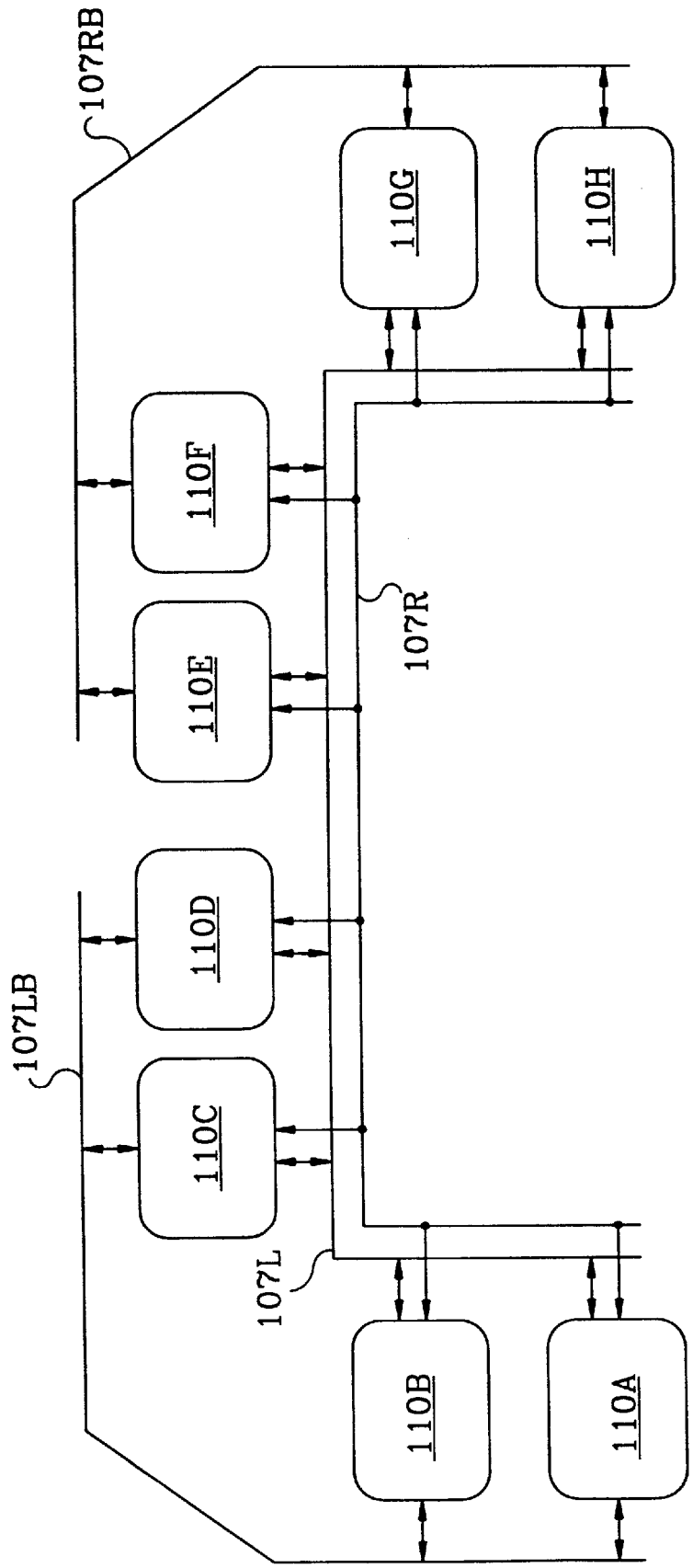
FIG. 2 is a block diagram of a prior art avionics bus.
Figure 3:
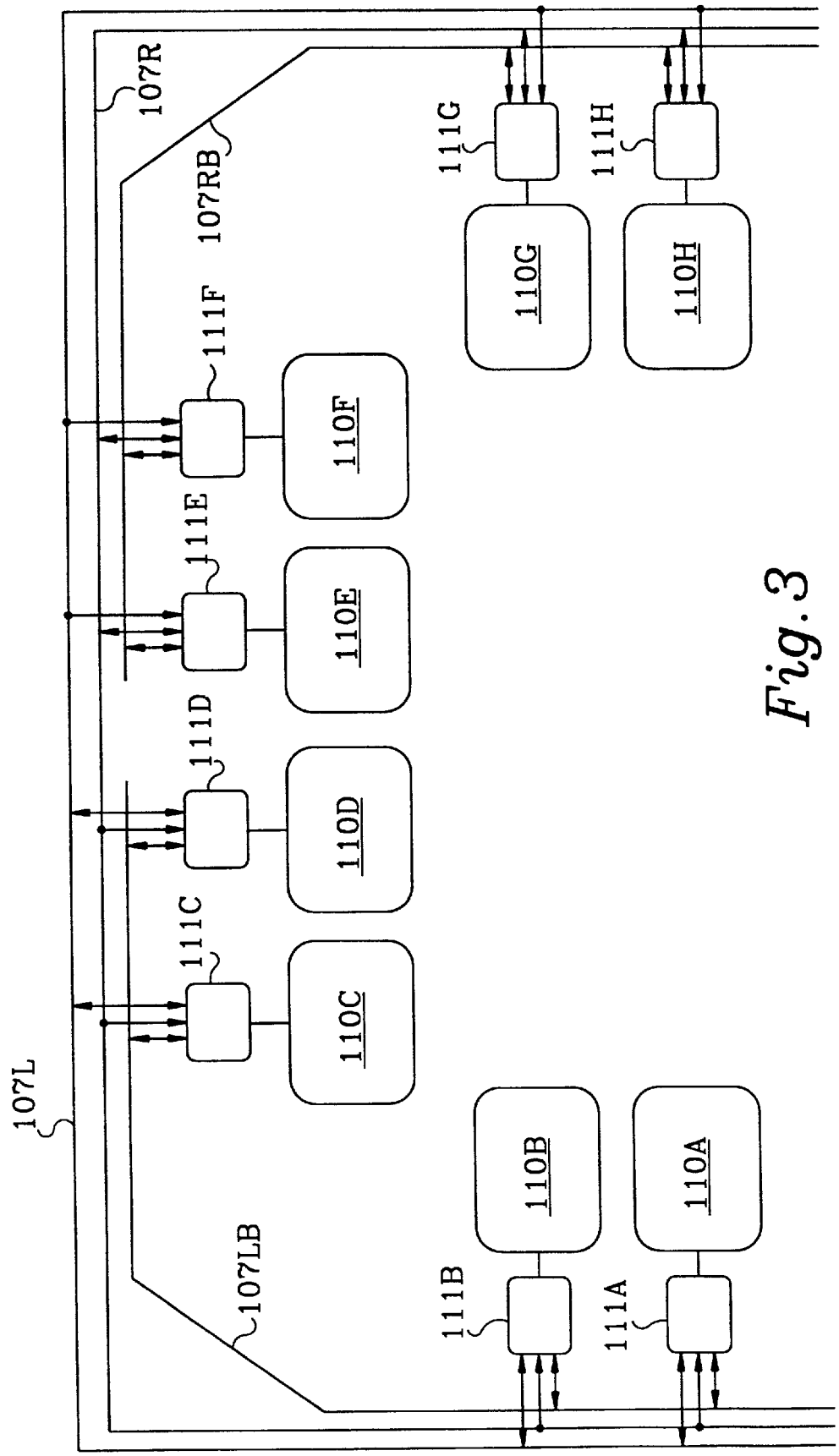
FIG. 3 is a block diagram of the present communications system.

Referring to FIG. 3, avionics components 110 are organized into a pilot's side and a co-pilot's side. There is provided a pilot's bus 107L and a co-pilot's bus 107R, each bus being in communication with each avionics component 110.

In addition to the primary pilot's bus 107L and co-pilot's bus 107R, a pilot's backup bus 107LB and a co-pilot's backup bus 107RB interconnect avionics components 110 on the same side of the aircraft. It is a critical component of this invention that each bus conform to IEEE 802.3 ethernet standards. In the preferred embodiment, each bus will be embodied as a coaxial cable. RG-58 thin coaxial cable is particularly well-suited to the present invention, although any type of coaxial cable conforming to the ethernet specification may be used.

Avionics components 110 communicate via the ethernet-compliant data buses 107. Each avionics component utilizes a network interface controller (NIC) 111 to transmit and receive data. The NICs utilized in the present system communicate simultaneously with the pilot's side bus 107L, the co-pilot's side bus 107R, and at least one backup bus. These NICs may be coupled to each data bus through standard ethernet connectors. For example, if the cables correspond to 10base2 ethernet specifications, NICs may interface with the cables through widely-available BNC-type connectors. All embodiments of the present communications system conform to ethernet physical layer specifications; all electrical connections between the NICs and the buses comply with the IEEE 802.3 standard.

Figure 4:
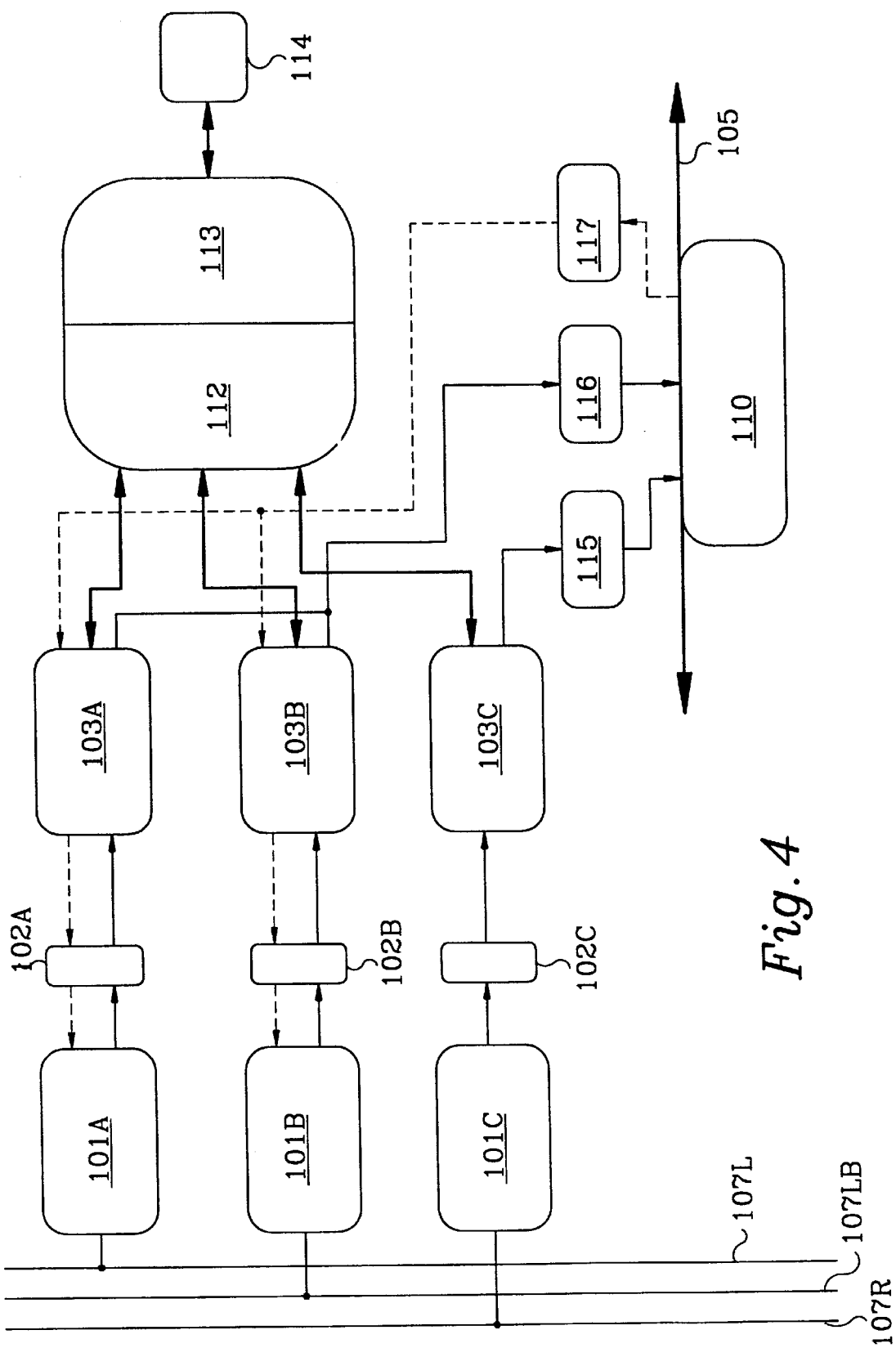
FIG. 4 is a block diagram of a first embodiment of a network interface controller.

FIG. 4 discloses a NIC suitable for use in the present communications system. The NIC includes three prior art ethernet transceivers 101A, 101B and 101C corresponding to each bus in communication with the NIC. In the embodiments shown, three transceivers 101 correspond to an onside bus 107L, a cross-side bus 107R and a backup bus 107LB. Each transceiver 101 is capable of receiving analog signals on the associated ethernet bus and of converting these analog signals to digital equivalents that can be transmitted through the NIC to an avionics component 110. Each transceiver is also capable of receiving digital signals from the avionics component 110 and converting these signals to analog equivalents for transmission on the ethernet bus.

Each transceiver communicates with a prior art system network interface controller (SNIC) 103 capable of exchanging digital data between the transceiver 101 and random access memories acting as data buffers. Two receive buffers 115 and 116, corresponding to data received from onside and cross-side buses, are provided along with a single transmit buffer 117.

Each buffer communicates with a backplane bus 105 which is an integral part of or otherwise communicates with an avionics component 110. Data that has been stored in the receive buffers 115 and 116 may be made available to the avionics component 110 through a memory addressing scheme whereby the avionics component 110 intermittently polls each receive buffer to determine if any received data is waiting. Alternatively, received data may be made available to the avionics component 110 by simulcasting or "fanning out" accumulated data across the backplane bus 105 at a regular time interval.

Similarly, data that is to be transmitted by the NIC on the ethernet buses passes from the backplane bus 105 to a transmit buffer 117. Data may be placed in the transmit buffer 117 through synchronous or asynchronous polling of backplane bus 105, or by data simulcast across the backplane bus 105 at regular or interrupt-driven intervals.

In preferred embodiments, transceivers 101 and SNICs 103 are separated by prior art isolation means 102. Although isolation circuits 102 are not necessary to implement the NIC, they are useful in improving signal quality and reliability. Moreover, the isolation means 102 are capable of preventing transmissions on the ethernet buses 107 if the NIC should fail, thus preventing the distribution of corrupt or inaccurate data.

A critical component of the invention is a microcontroller 112 positioned in communication with SNICs 103. Although the electrical characteristics of data transmissions on ethernet buses 107 conform to the IEEE 802.3 standard, access to the buses is not according to the ethernet CSMA/CD scheme. Rather, the microcontroller 112 sequences data transmissions on each ethernet bus according to a table stored in a non-volatile memory 113. The table is unique to each implementation of the communications system, with each avionics component 110 being allocated a fixed amount of bandwidth in a pre-determined sequence. Each component is guaranteed periodic access to the network according to the lookup table. Hence, access to ethernet buses 107 is not CSMA/CD, but rather is synchronous and deterministic.

Because the timing sequence affects all components communicating on the ethernet buses 107, all NICs utilizing the buses 107 must retain identical timing tables in non-volatile memory. Sequencing data transmissions according to a timing table allows for improved reliability, since all avionics components can anticipate and monitor the communications of other components. Moreover, each component is guaranteed periodic access to the bus, thus insuring that critical messages can be passed along the bus without delay.

In the preferred embodiments of the communications system, a circuit 114 monitors the availability of electric power and the "heartbeat" of microcontroller 112. Heartbeat signals, also known as "watchdog" signals, are based upon the frequency of data transmission and are well-known in the prior art. If power should fail or microcontroller 112 should malfunction, the monitor 114 identifies the condition and disables transmissions before corrupted data can be broadcast to other components via the ethernet buses 107. Transmissions on the ethernet buses 107 may be disabled by shutting down transceivers 101 or SNICs 103, by clearing the transmit buffer 117, or by creating an open circuit within isolation circuits 102.

Figure 5:
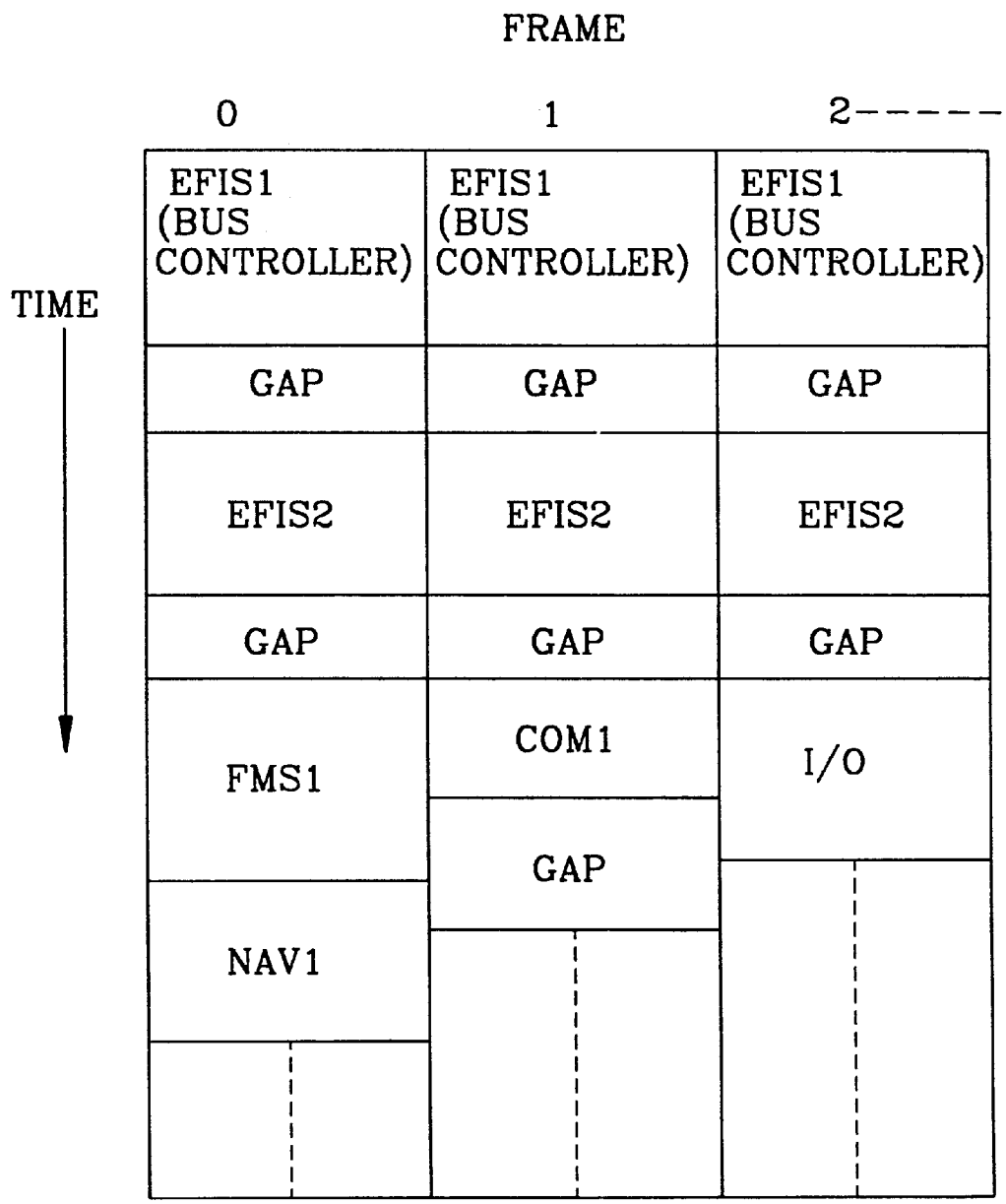
FIG. 5 is a timing diagram representing transmission data stored in a non-volatile memory means.

Referring to FIG. 5, a hypothetical timing scheme that could be represented in a non-volatile memory of a microcontroller is disclosed. Bandwidth is allocated according to frames, each frame being of a fixed time duration. For example, each frame could represent 10 microseconds. Each component communicating via the ethernet buses retains the same timing information; each component transmits data in sequence according to the timing table. One avionics component is arbitrarily chosen to initiate data transmissions on the bus, and the NIC associated with that component is identified as a bus controller. In FIG. 5, for example, an EFIS1 system is identified as the bus controller. All components monitor transmissions of all other components on the ethernet buses. Therefore, when the bus controller begins transmitting, all other components receive data from the bus controller and recognize the beginning of the transmit sequence. Referring to FIG. 5, the EFIS1 bus controller receives the full bandwidth of the ethernet buses for a fixed period of time. When the EFIS1 has completed its transmission, all components recognize a brief timing gap. Then, EFIS2, which is the next component in the table, transmits data on its onside and backup buses for the duration of its time allocation. Data transmissions are synchronous, since all transmissions take place for a fixed duration of time. Data transmissions are also deterministic, since each component is allocated transmission time in a pre-determined order. Each avionics component is therefore guaranteed access to the buses at regular intervals for fixed time durations.

Because the bus access scheme of the present communications system is synchronous, it is critical that components have a fault-tolerant means for frame timing. For the timing scheme disclosed herein to function properly, it is critical that at least those components on the same side of the aircraft substantially synchronize their bus communications. Moreover, it is highly desirable that components on opposite sides of the aircraft be in close synchronization. Therefore, components must have a method of identifying a common "time zero".

One method of synchronizing transmissions arbitrarily designates two avionics components on each side of the aircraft as bus controllers. The first bus controller to power up and come online to the network will be the primary bus controller, and the second to come online will be the secondary bus controller. Either bus controller can transmit a starting sequence on the onside and backup buses; other components on the same side of the aircraft will receive these transmissions and recognize the starting point of the communications sequence. If neither bus controller becomes active, or if a bus controller fails, other components on the network can obtain a clock signal through the cross-side bus from bus controllers operating on the opposite side of the aircraft.

Moreover, bus controllers on opposite sides of the aircraft can monitor each other through the cross-side buses. By monitoring the flow of data on the cross-side buses, bus controllers can ensure that clock signals remain in check across the aircraft.

Referring again to FIG. 4, a NIC is implemented with three half or full duplex SNICs 103A, 103B and 103C, each SNIC corresponding to a transceiver (101A, 101B and 101C, respectively) in communication with an ethernet bus (107L, 107LB and 107R, respectively). Dotted lines represent paths of data to be transmitted on the ethernet buses; solid lines indicate paths of data received. In the preferred embodiment shown, the controller receives data via all three buses 107L, 107LB and 107R, but transmits data only on onside bus 107L and backup bus 107LB. This arrangement maximizes bandwidth allocation across all buses while ensuring that each component is capable of receiving data from all other components, including those on the opposite side of the aircraft. The microcontroller 112 monitors data communications of each component and compares the contents of data received with the timing table stored in non-volatile memory 113.

When data is received from a component on the opposite side of the aircraft, microcontroller 112 instructs SNIC 103C coupled to the cross-side transceiver 101C to transfer data to a receive buffer 115 for eventual simulcast across backplane bus 105. When a component on the same side of the aircraft transmits data, however, identical data can be received via either the onside bus 107L or backup bus 107LB. A switching means (not shown), which may be implemented in software in the microcontroller or as a hardware element, determines whether the onside or backup SNIC passes the information received to the second receive buffer.

Component data to be transmitted accumulates in the transmit buffer 117 as discussed above. When the microcontroller 112 identifies that the transmit period corresponding to component 110 has arrived, it directs onside SNIC 103A and backup SNIC 103B to obtain data from transmit buffer 117 and to pass the data to the respective onside and backup transceivers 101A and 101B for transmission on ethernet buses 107L and 107LB, respectively. In this manner, data can be transmitted and received from the various components via the multiple buses in accordance with the tables retained by the microcontroller.

Figure 6:
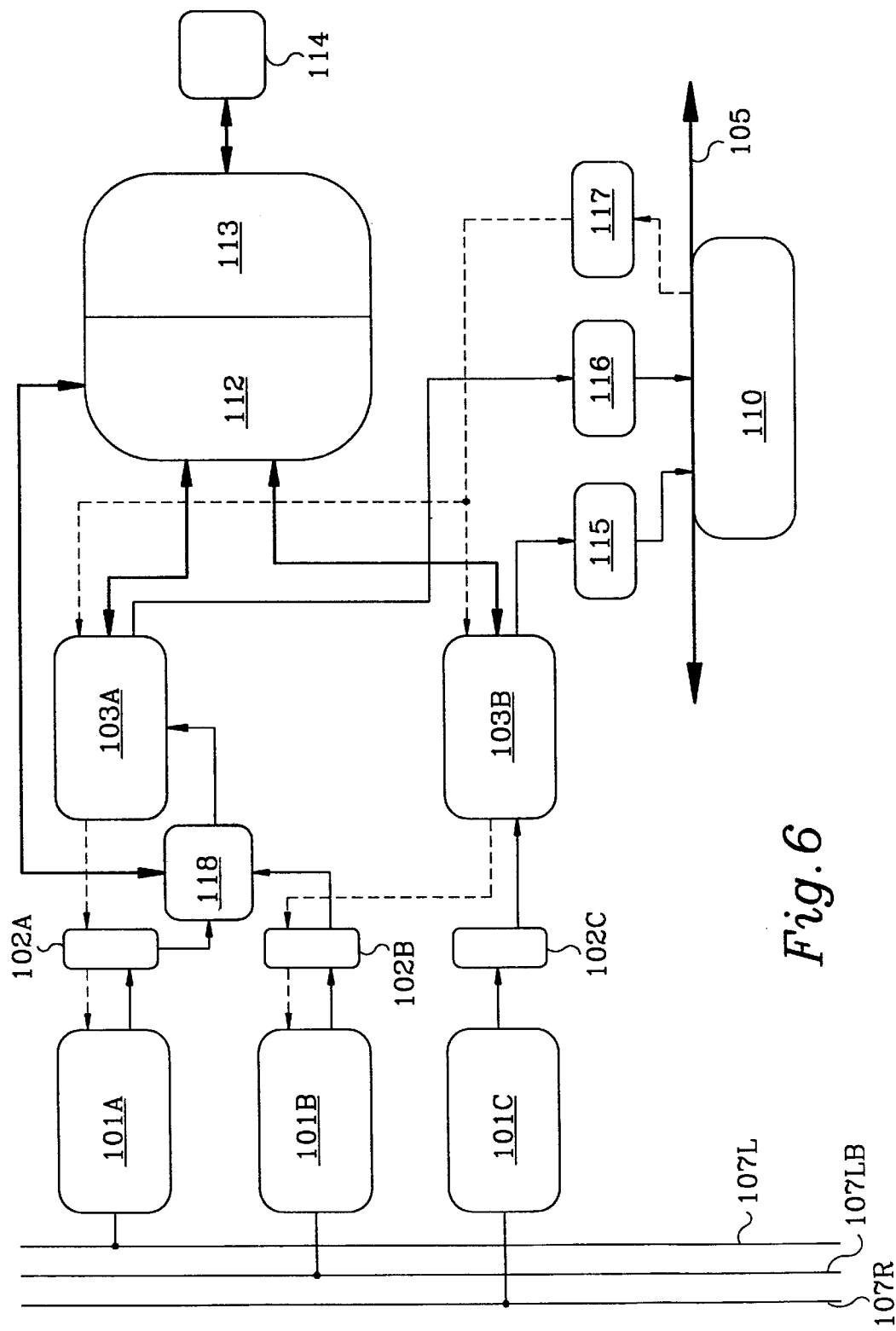
FIG. 6 is a block diagram of a second embodiment of a network interface controller.

Referring now to FIG. 6, a second embodiment of the network interface controller is disclosed. As in FIG. 4, solid lines represent paths of data received and dashed lines represent paths of data to be transmitted. Although each NIC is in communication with an onside bus 107L, a cross-side bus 107R and a backup bus 107LB as in the previous embodiment, only two SNICs 103A and 103B are utilized. Because each SNIC may transmit on one bus while receiving on another bus, full-duplex SNICs must be used to ensure rapid and reliable data handling.

The microcontroller 112 again directs data handling in accordance with a lookup table retained in non-volatile memory 113. When the table indicates data received from a cross-side component, microcontroller 112 directs SNIC 103B to transfer data received on the cross-side bus 107R to a first receive buffer 115. When data is received from on onside component, however, a switch 118 is necessary to determine whether backup or onside data is provided to the SNIC. This switch may be implemented as hardware or software, and is directed by microcontroller 122. Whether onside or backup data is provided to SNIC 103A, the microcontroller 122 will direct SNIC 103A to place data received in a second receive buffer 116.

Data to be transmitted by the network interface controller passes from the backplane bus 105 of the avionics component 110 to the transmit buffer 115 as described above. When the timing table indicates that the component's transmit time has arrived, microcontroller 122 will direct SNICs 103A and 103B to obtain data from transmit buffer 117 and to transmit the data on ethernet buses 107L and 107LB, respectively. Note that while SNIC 103B receives data from the cross-side bus 107R, it transmits data on the onside backup bus 107LB.

The corresponding structures, materials, acts and equivalents of all means or step plus function elements in the claims below are intended to include any structure, material, or acts for performing the functions in combination with other claimed elements as specifically claimed. The scope of the invention should be determined by the appended claims and their legal equivalents, rather than by the examples given.

What is claimed is:

1. A network interface controller connecting a component to a redundant communications bus having at least two data conductors, said network interface controller comprising:
   at least three transceivers, each transceiver being in communication with at least one of said conductors;
   a plurality of system network interface controllers (SNICs), each SNIC being in communication with at least one of said transceivers; and
   a microcontroller in communication with each of said SNICs, said microcontroller being configured for sequencing data transmitted by said transceivers on said redundant communications bus.

2. The network interface controller of claim 1, wherein said microcontroller communicates with a non-volatile memory means having a lookup table, said lookup table corresponding to a timing sequence for transmitting data on said redundant communications bus.

3. The network interface controller of claim 1, wherein said transceivers are ethernet transceivers.

4. The network interface controller of claim 2, further comprising means for monitoring electrical power supplied to said microcontroller.

5. The network interface controller of claim 4, further comprising a watchdog means for monitoring the heartbeat of said microcontroller.

6. A redundant communications system for electronics components comprising:
   a plurality of conductors including at least a left side bus, a right side bus, a left backup bus and a right backup bus; and
   a plurality of network interface controllers, each network interface controller being in communication with one of said electronics components, said left side bus, said right side bus and either of said left backup bus or said right backup bus, and each network interface controller comprising:
      a plurality of transceivers, each transceiver corresponding to one of said conductors;
      a plurality of system network interface controllers (SNICs), each SNIC being in communication with at least one transceiver and said electronics component; and
      a microcontroller coupled to said SNICs and sequencing data transmitted on said conductors.

7. The communications system of claim 6 wherein said conductors are ethernet conductors.

8. The communications system of claim 7 wherein said conductors are coaxial cables.

9. The communications system of claim 6 wherein said electronics components are avionics components.

10. The communications system of claim 9 wherein said microcontroller communicates with a non-volatile memory means having a lookup table, said lookup table corresponding to a timing sequence for transmitting said data on said redundant communications bus.

11. A communications system of claim 10 wherein said timing sequence is synchronous and deterministic.

12. A communications system of claim 11 further comprising means for verifying the presence of electric power and the heartbeat of said microcontroller.

13. A method of transmitting an electronic message between a first avionics component and a second avionics component, the method comprising the steps of:
   receiving the electronic message from the first avionics component at a first system network interface controller (SNIC) and at a second SNIC;
   monitoring a sequence of communications at a controller;
   providing a signal from the controller to the first SNIC and to the second SNIC in response to the sequence of communications;
   providing the electronic message from the first SNIC to a first transceiver and from the second SNIC to a second transceiver in response to the signal from the controller;
   the first transceiver transmitting the electronic message on a first data bus that is in communication with the second avionics component; and
   the second transceiver transmitting the electronic message on a second data bus that is in communication with the second avionics component.

14. The method of claim 13 further comprising the steps of:

provide the electronic message from the first SNIC to a third transceiver in response to the signal from the controller; and the third transceiver transmitting the electronic message on a third database that is in communication with the second avionics component.

15. The method of claim 13 further comprising the steps of:

receiving the electronic message at a third SNIC;

providing the signal from the controller to the third SNIC in response to the sequence of communications;

providing the electronic message from the third SNIC to a third transceiver in response to the signal from the controller;

the third transceiver transmitting the electronic message on a third data bus that is in communication with the second avionics component.

16. The method of claim 15 wherein the first data bus, second data bus and third data bus are ethernet cables.

17. The method of claim 13 wherein the first data bus and the second data bus are coaxial cables.

18. The method of claim 13 wherein the first data bus and second data bus are ethernet cables.

* * * * *